Aug. 9, 1955    G. J. SZEKELY    2,715,094
HERMETICALLY SEALED TRANSFORMERS
Filed Oct. 31, 1952
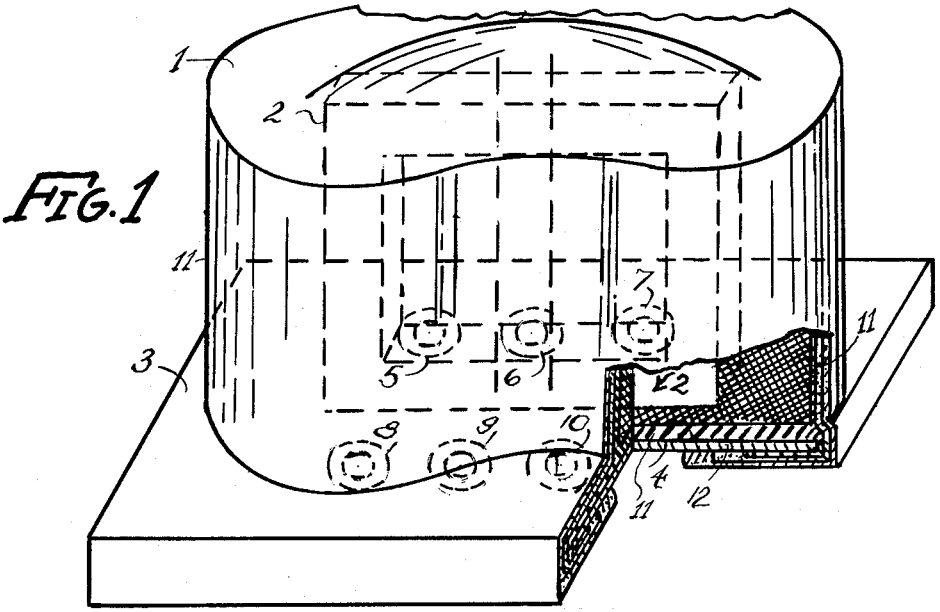
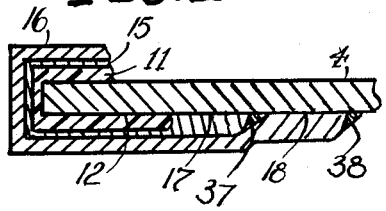
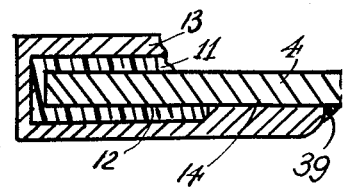
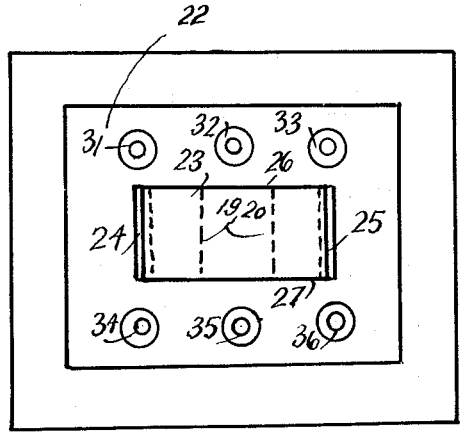
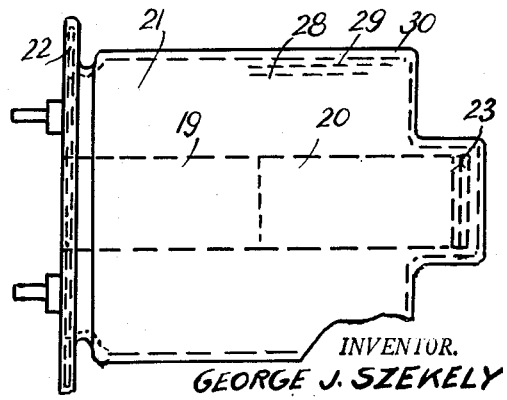
INVENTOR.
GEORGE J. SZEKELY
BY Theodore Hafner
ATTORNEY United States Patent Office 2,715,094
Patented Aug. 9, 1955

2,715,094

HERMETICALLY SEALED TRANSFORMERS

George J. Szekely, Bloomsbury, N. J., assignor of one-half to Crest Laboratories, Incorporated, a corporation of New York, and one-half to S. K. Transformer Company, Bloomsbury, N. J.

Application October 31, 1952, Serial No. 317,995

4 Claims. (Cl. 204—20)

This invention relates to the hermetic sealing of electrical circuit components such as transformers, reactors, inductances and any other circuit elements requiring not only good electric insulation but also mechanical protection from atmospheric, chemical, physical and any other influences.

One of the objects of this invention is to provide a hermetically sealed inductance element of minimum weight and space requirements so as to permit its use in portable or air borne equipment, at the same time being relatively insensitive to any physical or chemical attacks occurring in operation, and without being affected in its quality and characteristics by such attacks.

Another object of this invention is a transformer or reactor coated or impregnated with an electrical insulation which is temperature and moisture resistant, yet at the same time is made mechanically strong, without involving cumbersome metal casings and expensive soldering or welding operations.

A more specific object of the invention is to provide a transformer or reactor on a base or terminal plate wherein the inductance element itself is coated with a temperature and moisture resistant insulating plastic and an overlapping or laminated seal is provided between such coating and the base plate.

A further object of this invention is to apply the insulating coating to at least a circumferential portion of the base plate supporting inductance elements together with the electrical outlets or terminals therefor and to apply another appropriate coating over at least a portion of the insulating coating and an adjoining portion of the base plate, whereby the seam between plastic and base plate is additionally sealed.

In another embodiment of this invention, a transformer or inductance supported on a base plate and coated with a temperature and moisture proof plastic is additionally covered with a conducting or metallic layer extending beyond the plastic over at least a portion of the uncoated base plate. Thereby the seam between plastic coating and base plate is sealed with a metallic layer insuring not only mechanical protection but also complete tightness.

In an additional embodiment of this invention, the metallic or protective coating of the plastic is reinforced by an additional coat which is provided for example by electroplating or any other method, insuring sufficient coverage, thickness and the greatest possible mechanical strength as well as better sealing conditions due to the enhanced thickness and the greater stability of that protective coating.

These and other objects of the invention will be more fully understood from the drawings annexed herewith in which Fig. 1 represents in perspective a transformer embodying certain features of the invention.

Fig. 2 shows on an enlarged scale a hermetic seal as provided in Fig. 1.

Fig. 3 represents a modified sealing arrangement, and

Figs. 4 and 5 in top and side views respectively, represent a modified reactor unit embodying other features of the invention.

In Fig. 1, a transformer winding 1 supported on a laminated iron core 2 is shown to be supported through core 2 on a base 3 including metal plate 4 from which terminals are shown to project as schematically indicated at 5, 6, 7, 8, 9 and 10.

Terminals 5 through 10 of othterwise well known construction are mounted in a leak proof manner which is also well known in the art.

Hitherto, in order to assure mechanical stability and hermetic sealing of transformer 1, 2, the entire transformer after having been impregnated or filled in vacuum with the necessary plastic or liquid was surrounded with a casing, soldered, welded or otherwise attached in a leak proof manner to base plate 4. This process was not only expensive in assembly but also unsatisfactory in that such a reactor unit required relatively large space and weight.

In accordance with the invention, as shown in Fig. 1, transformer 1, 2, itself is coated with a moisture and temperature resistant plastic layer 11 such as made for example from insulating resinous compounds.

This plastic coating applied in vacuum in the usual manner, as also apparent from Fig. 1, is shown to extend not only over transformer parts 1, 2, but also over at least part of base plate 4 for example a circumferential edge portiton 12.

The resin or plastic is applied in well known manner and it may be of any appropriate structure without exceeding the scope of the invention.

In accordance with a relatively simple embodiment of this invention, as shown more clearly in Fig. 3, resin layer 11 is additionally coated with a protective metal or conducting layer 13 consisting for example of a bronze or copper coating sprayed in the form of an emulsion on top of layer 11 in such a manner as not only to cover layer 11 but also to extend beyond layer 11 and cover a free circumferential portion 14 of base plate 4 as shown in Fig. 3.

In this way, effective sealing of the transformer unit is assured; at the same time metal layer 13 provides sufficient mechanical strength to protect the unit from physical or chemical attack. Compared with reactors or transformers enclosed in a hermetic housing, the weight of the entire unit is reduced to an indispensible minimum provided by the weight of the transformer, base plate and terminals only.

Metal layer 13 can be applied in any appropriate manner, well known per se, such as provided for example by the so-called Schoop metallizing process, or any other process where metallic or conducting layers of sufficient mechanical strength and density are used to assure practical puncture proofness of the entire unit for a relatively long duration under rather strenuous operating conditions.

In the seal of Figs. 1, 2, first a base layer 15 of relatively weak but sufficiently dense structure is applied to insulation 11, layer 15 for example consists of a silver flash produced by precipitation, vaporization in vacuum or any other process permitting metallization of an insulating plastic.

Thereafter another layer 16 providing mechanical strength and sufficient coverage is applied onto the base layer 15 preferably by electroplating or any other process permitting the controlled build up of rather thick or strong flexible coatings such as made of copper.

In Fig. 3, the silver base layer 15 applied by a vacuum vaporization is shown at 17 to extend over and beyond the plastic coating onto the blank portion of base plate 4.

The additional layer 16 consisting for example of copper applied by electroplating and coextensive with silver layer 15 is shown to extend beyond silver layer 15 over a portion 18 of the free surface of terminal plate 3 supporting the entire transformer structure (not shown).

In this way, additional sealing and protection will be provided by covering up the seam between silver layer 15 and base plate 4.

Exact determination of seal dimension and extension is obtained for example as is well known in the art of coating or painting by covering up those parts of the transformer or its base plate which are not to be affected, by the sealing material, by means of wax or any other coating—easily dissolved after the seal has been applied in the electroplating process.

The invention, of course, is not limited to the application of the protective material by electroplating.

Any other process such as precipitation or settling, can be utilized to produce the successive sealing operations on one or more successively produced seams, in accordance with the invention.

From the experiments underlying the invention, copper has been found an extremely useful outer surface material; subsequent blackening of the copper surface provides the unit with a relatively dark heat radiating surface and therefore permits operation of the transformer with maximum output and efficiency.

The invention is not limited to the transformer or reactor structures, terminal arrangements, coating and layer assemblies and seal arrangements shown and described but can be applied to any other form of seals between plastic and metal parts without exceeding the scope of the invention.

In a further modification of this invention which does not need to be described in detail, instead of a conducting or metal layer such as provided in the form of a silver flash by precipitation or vacuum vaporization, another plastic layer may be applied in the form of a conducting or semi-conducting plastic which is otherwise well known in the art such as a silicon type plastic which forms the basis of a subsequent plating or copper coating operation.

The invention further permits as apparent from Figs. 4 and 5 a simplified support of the transformer or reactor element on its base or terminal plate.

In this modification, the transformer or reactor core together with its coil is not supported as a preassembled unit onto the base plate but as apparent from Figs. 4 and 5 the two transformer halves 19, 20 making up the transformer core and put together after the insertion of coil 21, are attached to base plate 22 by means of a metal band 23 surrounding the two core halves 19, 20. The ends of band 23 after passing through slots 24, 25 in base plate 22 are soldered together in otherwise well known manner on the top of transformer core 19, 20. In this way, simultaneously with the assembly of the transformer parts 19, 20, 21, attachment of these parts to base plate 22 is assured.

Vacuum tightness at slots 24, 25 is secured by applying a solder or any other sealing material to slots 24, 25 and along the spaces between metal band 23 and base plate 22 at points 26, 27.

Now further in accordance with this invention, the entire unit is coated with a temperature and moisture proof insulating plastic similar to that shown in Figs. 1, 2 and 3 and also indicated in Figs. 4 and 5 at 28. A flash of silver is then precipitated or vaporized at 29 on top of coating 28 as shown to extend over the edge portions of base plate 22 and over the plastic coating 28 covering a circumferential portion of base plate 22.

Silver layer 29 is then reinforced by means of a plated copper layer 30 of sufficient thickness to insure mechanical and atmospheric stability of the entire unit. The copper coating 30 is plated in such a manner as to extend beyond the seals provided between silver layer 29 and plastic 28 as well as between silver layer 29 and base plate 22 as shown for example in Fig. 2.

The electrical outlets in this arrangement are shown at 31—36 to be mounted on both sides of metal base 22 and are mounted and constructed in otherwise well known manner not forming part of this invention.

In a further improvement of the invention, the edge of the metal coatings such as shown in Fig. 2 at 15 and 16 and in Fig. 3 at 13, is additionally sealed by applying solder to the seam between metal layers 13, 15 and 16 respectively, and metal plate 4 as indicated in Fig. 2 at 37, 38 and in Fig. 3 at 39.

The invention is not limited to this type of additional seam sealing but any form such as brazing, welding or the like can be provided without departing from the spirit of the invention.

I claim:

1. In a method for hermetically sealing an electrical apparatus of irregular shape, the steps of supporting said apparatus on a base plate containing electric outlet terminals, coating the unit with an insulation closely following the contour of said shape, and coating said insulation with a substantially electro-conductive layer extending over said coating on to said base plate whereby to seal the seam between insulation and base plate.

2. Method according to claim 1 wherein said conductive layer includes a number of layers of increasing thickness applied successively.

3. Method according to claim 1 wherein the base layer is of silver applied in vacuum vaporization, and a copper layer is applied thereon by electroplating, the copper layer extending on said base plate beyond the silver layer.

4. Method according to claim 1 wherein the base layer is of silver applied by precipitation, and a copper layer is applied thereon by electroplating, the copper layer extending on said base plate beyond the silver layer.

References Cited in the file of this patent

UNITED STATES PATENTS

| | | |
|---|---|---|
| 1,588,510 | Wear | June 15, 1926 |
| 1,763,115 | Wermine | June 10, 1930 |
| 2,136,609 | Butterfield et al. | Nov. 15, 1938 |
| 2,151,457 | Williams | Mar. 21, 1939 |
| 2,379,189 | Rupp | June 26, 1945 |
| 2,391,038 | Rifenbergh | Dec. 18, 1945 |
| 2,510,811 | Gale | June 6, 1950 |
| 2,579,898 | Brucker | Dec. 25, 1951 |
| 2,662,930 | Morelock | Dec. 15, 1953 |

FOREIGN PATENTS

| | | |
|---|---|---|
| 410,470 | Great Britain | May 14, 1934 |
| 22,711 | Australia | May 21, 1935 |